(12) United States Patent
O'Dell (10) Patent No.: US 6,408,791 B1
(45) Date of Patent: Jun. 25, 2002

(54) UNDERWATER FISH HABITAT

(76) Inventor: Robert D. O'Dell, 407 W. 7$^{th}$ St., Ogallala, NE (US) 69153

( * ) Notice: Subject to any disclaimer, the term of this patent is extended or adjusted under 35 U.S.C. 154(b) by 0 days.

(21) Appl. No.: 09/591,688

(22) Filed: Jun. 12, 2000

Related U.S. Application Data
(60) Provisional application No. 60/138,613, filed on Jun. 11, 1999.

(51) Int. Cl.$^7$ ................................................ A01K 61/00
(52) U.S. Cl. ...................................................... 119/221
(58) Field of Search ................................ 119/221, 222; 43/4; 405/15, 21, 25, 64; 441/6, 9, 23

(56) References Cited

U.S. PATENT DOCUMENTS

| | | | |
|---|---|---|---|
| 3,590,635 A | * | 7/1971 | Duing ........................ 441/23 |
| 4,057,141 A | | 11/1977 | Laurie et al. |
| 4,095,560 A | | 6/1978 | Laurie et al. |
| 4,099,281 A | * | 7/1978 | Bowley ........................ 441/6 |
| 4,334,499 A | | 6/1982 | Baass |
| 4,947,791 A | * | 8/1990 | Laier et al. .................. 119/221 |
| 5,201,136 A | | 4/1993 | LaMorte et al. |
| 5,213,058 A | | 5/1993 | Parker et al. |
| 5,236,756 A | | 8/1993 | Halliburton |
| 5,238,325 A | | 8/1993 | Krenzler |
| 5,315,779 A | | 5/1994 | Fussell |
| 5,370,476 A | * | 12/1994 | Streichenberger ............ 405/15 |
| 5,807,023 A | | 9/1998 | Krenzler |
| 5,820,295 A | * | 10/1998 | Buteaux ........................ 405/21 |
| 6,060,153 A | * | 5/2000 | McNeil ........................ 119/221 |

* cited by examiner

Primary Examiner—Charles T. Jordan
Assistant Examiner—Elizabeth Shaw
(74) Attorney, Agent, or Firm—Carter, Ledyard & Milburn (57) ABSTRACT

An artificial underwater habitat is disclosed comprising a structure with a downwardly opening cavity and an upwardly opening cavity including buoyancy means and ballast means. The habitat is preferably constructed in part by used tires. The habitat preferably maintains an upright orientation from the bottom of a body of water to provide an aquatic ecosytem and aquatic food chain at differing depths. The upright orientation of the habitat also minimizes the effect of silting on the habitat. The buoyancy means includes a novel structure for pressurized gas filled containers.

19 Claims, 11 Drawing Sheets

FIGURE 1

ANCHOR WEIGHT DETAIL

Vertical float application   Positive captive air in the event that greater buoyancy is required

FIGURE 5

2 liter plastic soft beverage container with plastic cap in place

FIGURE 6

Positive captive air floatation where horizontal floatation is desired

UNDERWATER FISH HABITAT

This application claims the benefit of U.S. Provisional Application Ser. No. 60/138,613 filed on Jun. 11, 1999 and herein incorporates by reference the entirety of U.S. Provisional Application Ser. No. 60/138,613.

BACKGROUND OF THE INVENTION

Aquatic life requires underwater structures in order to survive and thrive. Underwater structures provide the foundation for an aquatic ecosystem or aquatic food chain, including a place for vegetation and algae to attach as well as shelter for small crustaceans and aquatic insects. Underwater structures also fill other needs, such as providing spawning grounds, cover for fry, fingerlings, and small fish, as well as providing hiding places for larger fish to ambush an unwary passerby. These various needs require structure at varying depths. A structure that is confined to a single depth may not be able to fill all the needs of an aquatic ecosystem. Without proper underwater structures, the aquatic ecosystem may be missing parts of the food chain resulting in the body of water turning into a virtual desert in which aquatic life becomes scarce or non-existent. Overall, proper underwater structure is an oasis for aquatic life.

The problem of maintaining sufficient underwater structure to support an aquatic ecosystem is especially acute for man-made lakes and reservoirs. As man-made lakes age, the native timber and other inundated structures deteriorate causing a decrease over time in the capacity of the native timber and structures to support aquatic life. This problem is exacerbated by human-induced heavy silt and sludge flows covering the structure that does exist. Eventually, the structure becomes ineffective to support aquatic life which eventually results in a decrease of all aquatic life, including game fish.

A different problem that exists is the billions of used automobile and truck tires that litter the landscape and take up volume in innumerable land fills. These tires become a breeding ground for insects and vermin and have a negative impact on the quality of life in the area.

The present invention provides a solution to mitigate the negative impact of both the lack of underwater structures in bodies of water and the blight of discarded tires. The invention uses old tires or similar-shaped refuse, such as plastic bottle carriers, to form various underwater structures. The structures are preferably constructed of discarded tires connected tread-to-tread to form upright arrays of vertically-oriented tires. In another preferred embodiment, horizontally-oriented tires are spaced apart along PVC piping or along a flexible member to form an upright array. The PVC supported array is also suitable for laying on its side on the bottom of a body of water.

A tire, or other similar structure, typically has a cavity that is formed by the upper and lower sidewalls and the treadwall of the tire. A tire, or other similar structure, also has an aperture formed by the sidewalls of the tire. For a tire, or other structure, oriented vertically, i.e., in the same orientation as a tire would be if attached to the rim of a wheel on a car to transfer the rotational energy of the axle of the car to the road, the cavity is downwardly opening for the upper half of the tire or structure and upwardly opening for the lower half of the tire or structure. For a tire, or other structure, oriented horizontally, i.e., laying flat on the ground, the cavity of the tire, or other structure, is inwardly opening.

Each of these structures include a buoyant material and an anchor. The anchor acts to fix the structure to the bottom of a body of water, such as a lake bed. The buoyant material is dispersed within the structure so that the structure maintains a vertical, upright orientation to the lake bed and does not sink and lay flat on the bottom. The combination of anchor and buoyancy provides a structure that will not be subject to movement along the bottom of the body of water due to currents while maintaining a generally upright structure so that fish and other aquatic life can gain the benefits of the structure at whatever depth of water they choose to inhabit.

The structures can be of varying length, size, and shape, such as: a single tire; a linear array of tires connected together; a linear array of tires held together in a spaced-apart manner; a planar array of tires; a three or four sided pyramid; a cube; or virtually any other three-dimensional structure. Furthermore, the structure can incorporate other materials such as small trees or other natural vegetation as well as man-made material. The linear or planar array of tires can be constructed so that all of the tires are uniformly oriented, i.e., the aperture of the tires in the array all face the same direction. Conversely, the linear or planar array of tires can be constructed so that select tires are rotated ninety degrees so that the aperture of the rotated tires face in a direction normal to the direction of the non-rotated tires in the array.

The buoyant material is preferably a used plastic beverage container, such as a two-liter soda bottle, although other sizes can be used effectively. The buoyant material is preferably placed in the cavity of the tire formed by the two sidewalls and the tread. The buoyant material may be secured in the cavity ov the tire by any suitable means, such as tape, wire, or rope.

Two-liter soda bottles are manufactured to withstand internal pressurization from the soda and these bottles will tolerate some abuse without tearing or bursting thereby making them an ideal buoyant device. For the present invention, the soda bottle can preferably be charged with pressurized gas to prevent the soda bottle from collapsing due to the pressure of the water surrounding the bottle when the artificial underwater habitat is deployed at depth.

In order to charge the soda bottle, or other container, with pressurized gas, a hole is drilled in the center of the plastic cap to the soda bottle and a flexible circular disk gasket with an eccentric hole is inserted in the cap. The hole in the cap must not align with the hole in the gasket. The gasket is preferably cut from a discarded medium-weight inner tube, although any similar type of material that can function in a similar manner will suffice. The cap and gasket is screwed onto the container and a pressurized gas is admitted to the container via a nozzle through the hole in the cap. The gasket flexes to allow the pressurized gas to enter the container. When the nozzle is removed, the gasket flexes back to make contact with the inside surface of the cap. Since the hole in the cap and the hole in the gasket are not aligned, the pressure of the gas in the container maintains the gasket against the inside surface of the cap thereby sealing the pressurized gas in the container. Other means of providing buoyancy to the structure are also contemplated, such as styrofoam, bubble wrap, or air trapped within the cavity of the tire.

The anchor is preferably concrete, concrete block, or can be comprised of a discarded one-gallon plastic jar, such as the type manufactured as a bulk food container, filled with sand or concrete. The anchor is preferably deployed in the cavity of the tire but may be connected externally to the tire by a flexible member such as a wire, nylon, or hemp rope, chain, or plastic connector, or by a rigid member such as PVC pipe. Another preferred anchor is comprised of wire mesh and gravel. The tire is horizontally-oriented and the wire mesh is fitted within the tire so as to cover the aperture formed by the annulus of the lower sidewall of the tire. Gravel is then placed on the wire mesh and is constrained on the bottom by the wire mesh and on the sides by the tread of the tire. In addition to providing ballast, the gravel also provides a spawning site for certain species of fish.

The structure of the present invention is relatively inexpensive to manufacture, easy to fabricate and deploy, is extremely durable, and will maintain its integrity for many decades. The structure will deploy in an upright position on the bottom. Even with silting and bottom sedimentation, this type of structure will continue to provide a viable habitat until completely covered, which will take decades. It is expected that fish, crustacean, aquatic insects and other organisms will concentrate on and around this type of structure. Waste materials produced by these creatures should concentrate organic matter on the bottom and, over time, serve to enhance aquatic plant growth, thereby increasing the oxygen supply available in waters surrounding the structure.

The configuration of a structure of the present invention will allow fish of all sizes to move up and down the height of the structure seeking their "comfort zone" in regard to water temperature, available oxygen, forage, plant growth, and other variables. As a structure ages, and more organisms attach to it, an increase of plant life and small organisms will provide hatchlings more cover and forage required for survival.

The structure may be deployed as a single unit or in "pods" ranging from two units to hundreds of units. Preferably, a relatively small number of pods should be deployed in strategic locations throughout the body of water rather than concentrating a large number pods in any single location to more effectively scatter aquatic life around the body of water and thereby "seed" the body of water with a number of ecosystems to more rapidly increase the population of aquatic life.

The prior art has attempted to solve the problem of underwater structure with varying results. Some prior art attempts have used discarded tires. However, each attempt has either failed to provide a relatively permanent structure in an array with buoyancy so as to provide support for an ecosystem through differing depths, use discarded tires, or be simple to construct and deploy.

For example, the device disclosed in U.S. Pat. No. 5,315,779 to Fussell is an underwater habitat by using plates or discs that must be manufactured from a buoyant material rather than using discarded tires. An anchor is provided with a line that attaches to the center of each of the plates thereby requiring that the plates be manufactured identically so as not to cause the structure to be unbalanced. Additionally, the construction of the Fussell device limits those devices to a single vertical structure that cannot be joined to form any type of array.

The device disclosed in U.S. Pat. No. 5,213,058 to Parker, et al. ("Parker"), is a structure for harvesting stone crabs and is not intended to be a permanent structure to support an aquatic life ecosystem or food chain. When deployed, the Parker device collapses on the bottom of the body of water with the tires horizontally oriented and stacked one on top of the other. No buoyant means is provided within the device. Since the Parker device is deployed on the bottom of the body of water, it cannot support an aquatic ecosystem at differing depths. Additionally, a buoy must be attached to the top of the Parker device to enable the device to be found and hauled to the surface for harvesting and cleaning. The upper sidewall of each of the tires in the device is preferably removed to facilitate harvesting and cleaning operations. The construction of the Parker device, as with the Fussell device, constrains the device to a single stack of tires and does not allow for an array of devices to be constructed.

The devices disclosed in U.S. Pat. No. 5,238,325 and 5,807,023, both to Krenzler are an artificial reef and beach stabilizer that rest on the bottom of a body of water. Each device is constructed from discarded tires that have their sidewalls cut. The '023 device includes corrodible iron inserts, such as nails or staples. Neither the '325 or the '023 device contain any buoyancy and therefore neither can be constructed in upright arrays extending vertically from the bottom of the body of water. Nor does either device transcend a wide range of depths and thus cannot support an aquatic ecosystem at differing depths.

Accordingly, it is an object of the present invention to obviate many of the above problems in the prior art and to provide a novel artificial underwater habitat.

It is another object of the present invention to provide a novel artificial underwater habitat that is ballasted to rest on the bottom of a body of water and is held substantially upright by buoyancy integral to the habitat.

It is yet another object of the present invention to provide a novel artificial underwater habitat using discarded tires.

It is still another object of the present invention to provide a novel artificial underwater habitat in the form of a linear array of tires.

It is a further object of the present invention to provide a novel artificial underwater habitat in the form of a planar array of tires.

It is yet a further object of the present invention to provide a novel artificial underwater habitat that will be easily deployed so that the habitat will maintain the proper orientation upon settling at the bottom of a body of water.

It is still a further object of the present invention to provide a novel sealed container of pressurized gas to provide a buoyant force to an artificial underwater habitat These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 11 also is a sectional view of a horizontally-oriented tire with sand or concrete filled containers in the inwardly opening cavity of the tire to provide ballast.

DESCRIPTION OF PREFERRED EMBODIMENTS

Figure 1:
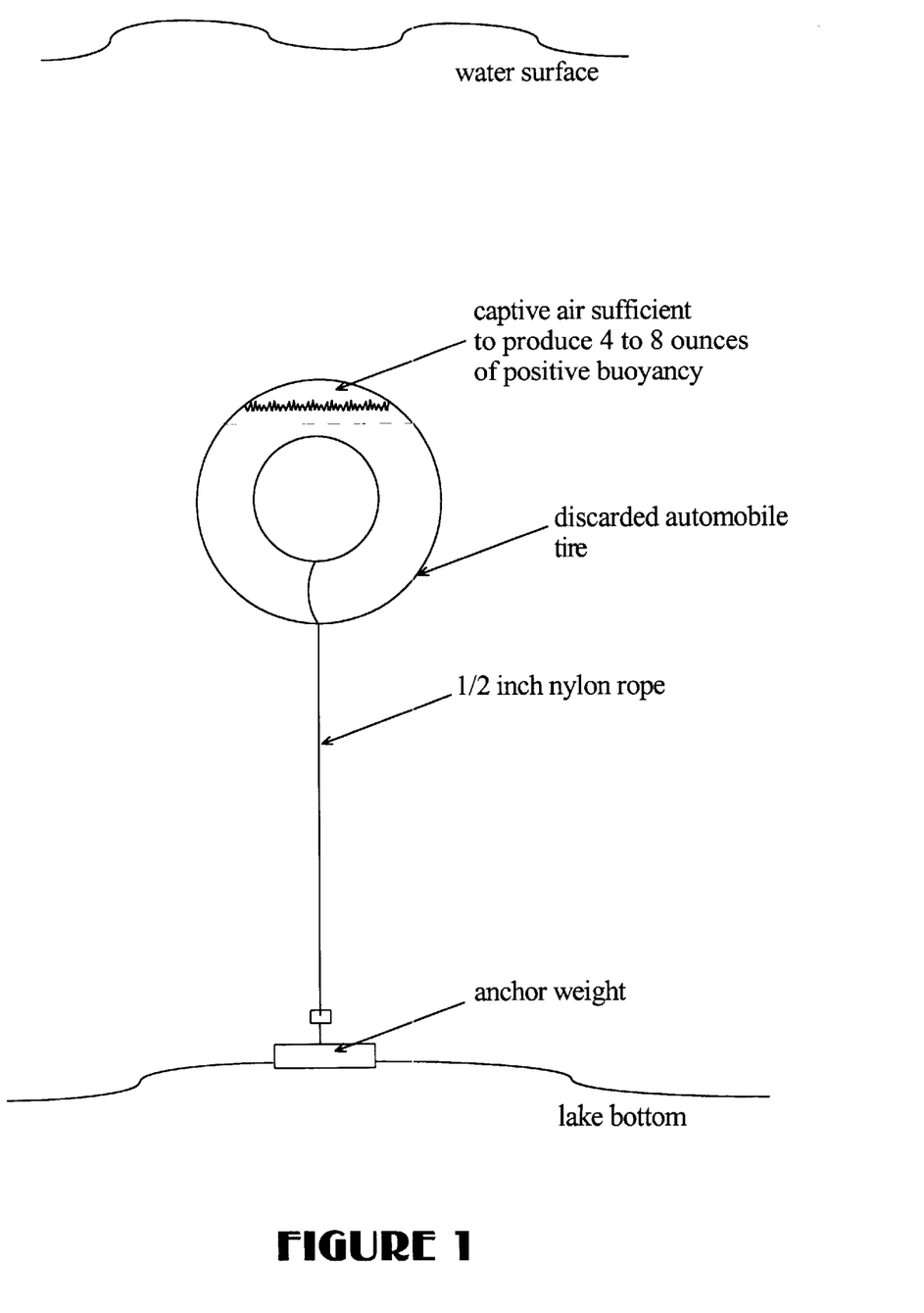
FIG. 1 is an elevation view of one embodiment of an artificial underwater habitat of the present invention.

Referring to one embodiment of the artificial underwater habitat as depicted in FIG. 1, an anchor 24 is in contact with the bottom of a body of water 28 and the anchor is operatively connected by the member 22 to the structure 20. The structure 20, preferably a used tire, is maintained above the anchor by a buoyant force provided by air trapped in the downwardly opening cavity 26 of the structure 20. The buoyant force may also be supplied by other buoyancy means, such as a material with a specific gravity less than the specific gravity of the surrounding water or with a gas filled pressurized container as described above.

Figure 2:
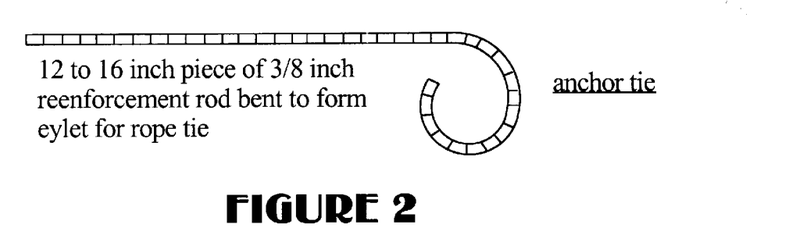
FIG. 2 is a partial sectional view of a vertically-oriented tire with gas filled containers in the cavity of the tire to provide buoyancy.

Referring to FIG. 2, the structure 20 is depicted in a vertical orientation in a partial sectional view to show the placement of the gas filled containers 30 in the downwardly opening cavity 26 of the structure. Any number of the gas filled containers 30 may be placed in the cavity so as to provide the proper amount of buoyancy for the particular embodiment of the artificial underwater habitat for which the structure is to be a part. For smaller habitats, only one gas filled container may be required whereas for larger habitats, three or more gas filled containers may be required. If the particular embodiment of the artificial underwater habitat requires more gas filled containers than are able to be fit within the cavity of the structure, other means of buoyancy can be attached to the structure as required.

It will be understood by one of ordinary skill in the art that each structure herein defined will have a cavity and that for the sake of clarity, not every structure depicted will show the cavity. Preferably, the structures referred to in this application can be old tires.

Figure 3:
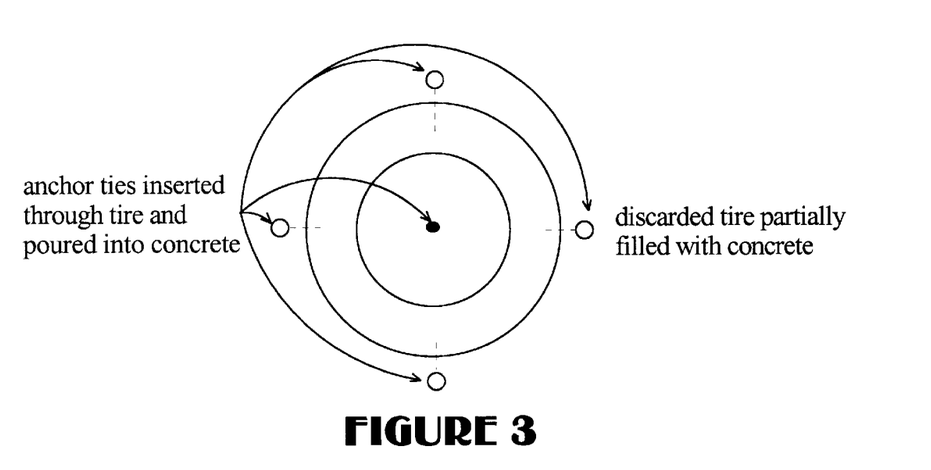
FIG. 3 is an elevation view of another embodiment of an artificial underwater habitat with a wire mesh and gravel anchor in the bottom tire and a gas filled container for buoyancy in the uppermost tire.

FIG. 3 is an elevation view of another embodiment of the artificial underwater habitat of the present invention. The anchor 24 is in contact with the bottom of a body of water 28 and is operatively connected to the structure 20a. The structure 20a is operatively connected to the structure 20b and the structure 20b is operatively connected to the structure 20. The structure 20 includes at least one gas filled container 30 within the downwardly opening cavity 26 for buoyancy. Only one gas filled container is shown in FIG. 3 for clarity. The structures 20a and 20b may also contain gas filled containers or any other type of means for providing buoyancy as desired. The structures 20, 20a, 20b, and the anchor 24 are shown connected together by wire but may also be connected by screws, nails, bolts, rope, fishing line, or by any other conventional means. The anchor 24 includes a wire mesh and gravel to provide ballast for the habitat as well as providing a spawning site for certain species of fish. The anchor can also include cement or sand filled containers, such as one gallon bulk food containers, in the inwardly opening cavity of the anchor. In another embodiment of the anchor, cement is poured in the aperture of the anchor thereby filling or partially filling the aperture and the inwardly opening cavity. The structures 20, 20a, and 20b are shown in a non-uniformly oriented manner. It will be understood by one of ordinary skill in the art that the habitat can also be constructed so that the structures are uniformly oriented.

Figure 4:
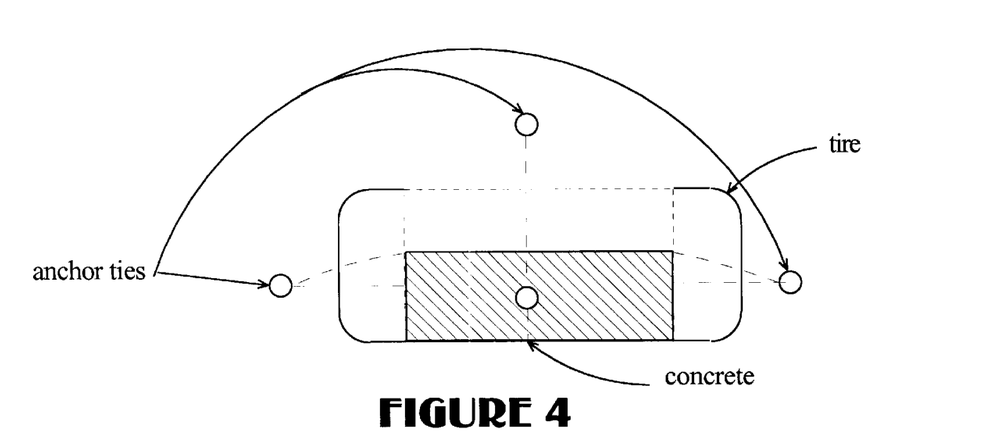
FIG. 4 is an elevation view of yet another embodiment of an artificial underwater habitat with a tree inserted in the habitat to provide additional cover for fry.

FIG. 4 is an elevation view of another embodiment of the present invention. This particular embodiment is a variation of the embodiment in FIG. 2. The anchor 24 is comprised of a structure including wire mesh and gravel as described above. The structures 20 are suspended above the anchor by buoyant means such as the gas filled containers 30 shown in FIG. 4 and are operatively connected to the anchor by any of the conventional means described above. A sapling 32, or other suitable material, is passed through the apertures of the structures 20 in order to provide additional cover for fry and other small fish. It will be understood by one of ordinary skill in the art that the habitat depicted in FIG. 4 can be repeated to provide a larger structure by connecting more anchors and structures together as well as by adding additional structures to the existing anchor.

Figure 5:
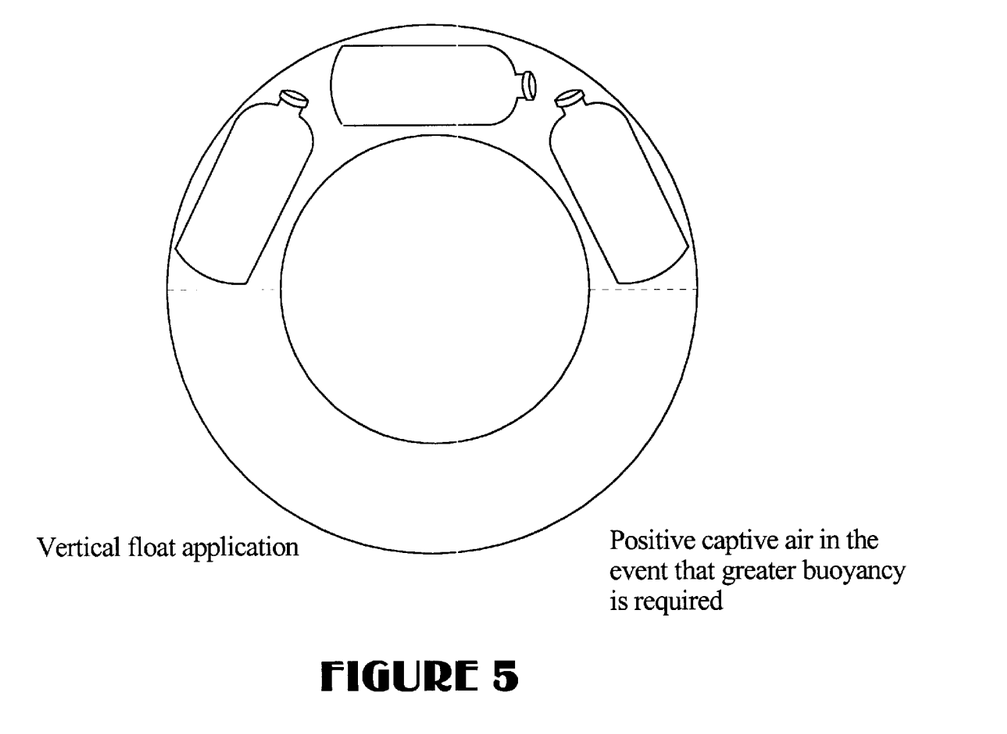
FIG. 5 is an elevation view of an embodiment of an artificial underwater habitat in a linear array with selected tires horizontally oriented and with trapped air in the uppermost tire to provide buoyancy.

The artificial underwater habitat in FIG. 5 is another embodiment of the present invention. The anchor 24 is in contact with the bottom of a body of water 28 and is operatively connected to the horizontally-oriented structures 20c, 20d, 20e and the structure 20 by conventional means described above. The structures 20c, 20d, and 20e each have an inwardly opening cavity which may include buoyancy means as described above. The structure 20 also may include buoyancy means within the downwardly opening cavity. A sapling 32 may or may not be deployed within the structure for additional cover for aquatic life.

Figure 6:
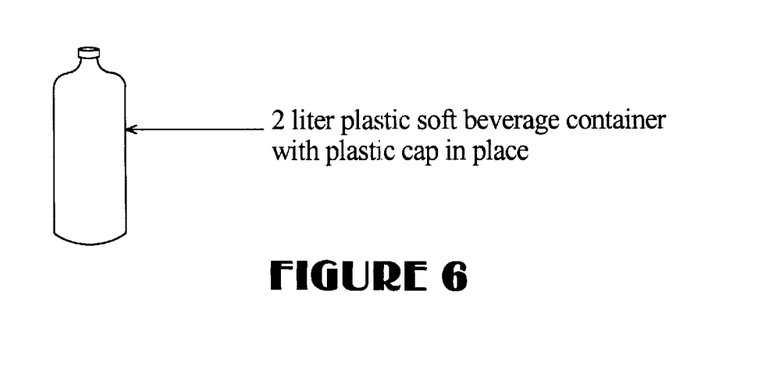
FIG. 6 is an elevation view of a pyramidal embodiment of an artificial underwater habitat of the present invention.
Figure 7:
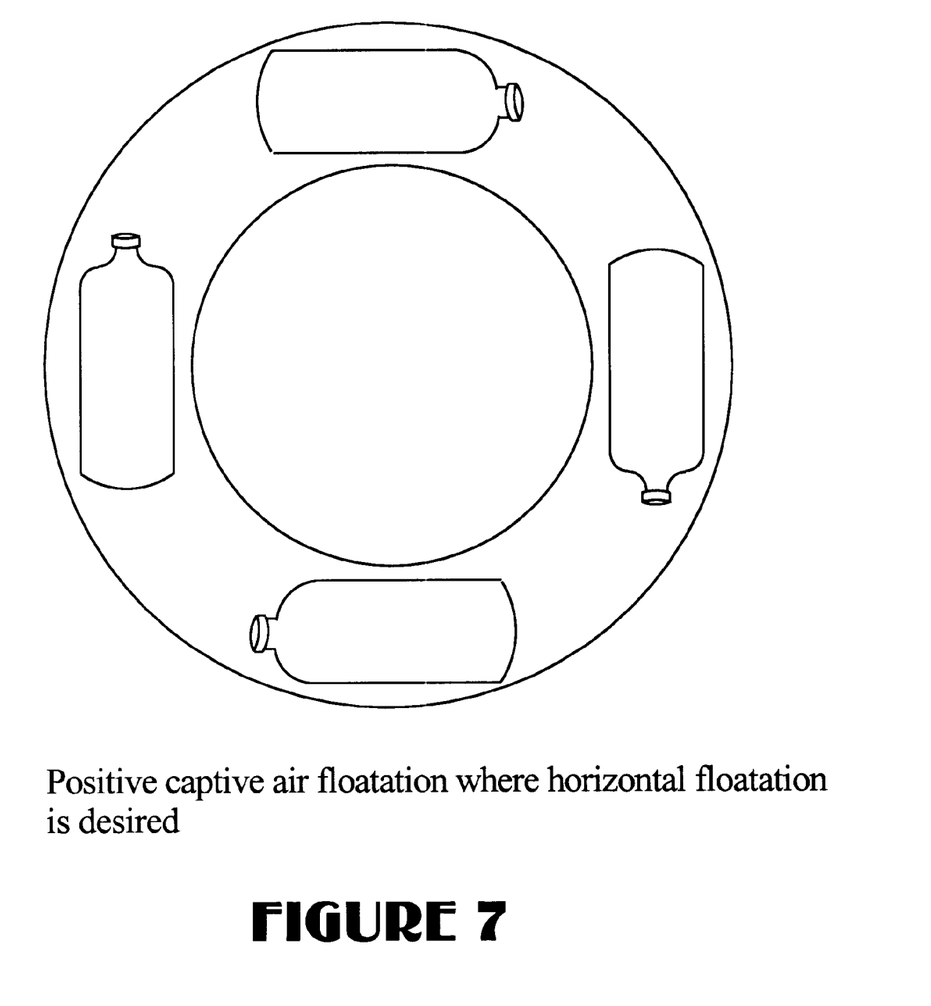
FIG. 7 is an elevation view of an embodiment of an artificial underwater habitat in a planar array.
Figure 8:
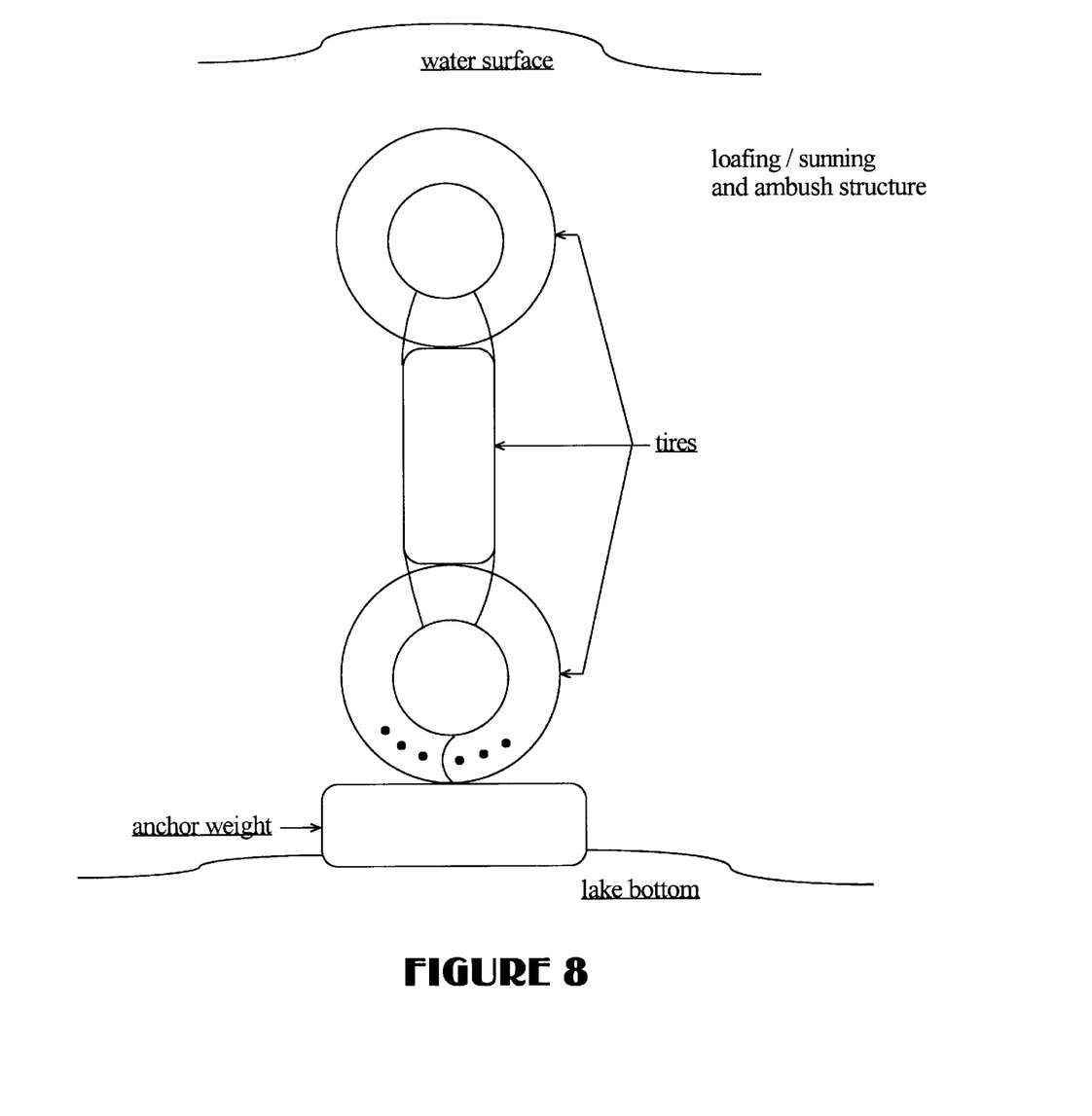
FIG. 8 is an elevation view of another embodiment of an artificial underwater habitat in a planar array.

The artificial underwater habitats shown in FIGS. 6, 7, and 8 are different embodiments of the present invention. FIG. 6 is an elevation view of a pyramidal habitat formed by a plurality of anchors 24 (two of which are shown) operatively connected together by conventional means and in contact with the bottom of a body of water 28. The habitat may be a three sided or four sided pyramid. The structures 20 are connected to their immediate neighbors by conventional means previously described. The structures at the bottom level of the habitat are connected to the anchors by conventional means. Selected structures 20 include buoyancy means (not shown for clarity) as previously described, such buoyancy means providing sufficient buoyant force to prevent the habitat from collapsing to the bottom of the body of water.

FIGS. 7 and 8 depict two variations of a planar array of the structures 20 to form further embodiments of the present invention. It will be understood by one of ordinary skill in the art that these planar structures can be extended upwards or laterally as desired by adding more structures to the array. Furthermore, the two ends of these planar arrays can be brought together and connected to thereby form a circular or other geometric shape. Additional structures can be overlaid on top of such a geometric shape to form an enclosure, such as a cube. Selected structures include buoyancy means (not shown for clarity), such buoyancy means providing sufficient buoyant force to prevent the habitat from collapsing to the bottom of the body of water.

Figure 9:
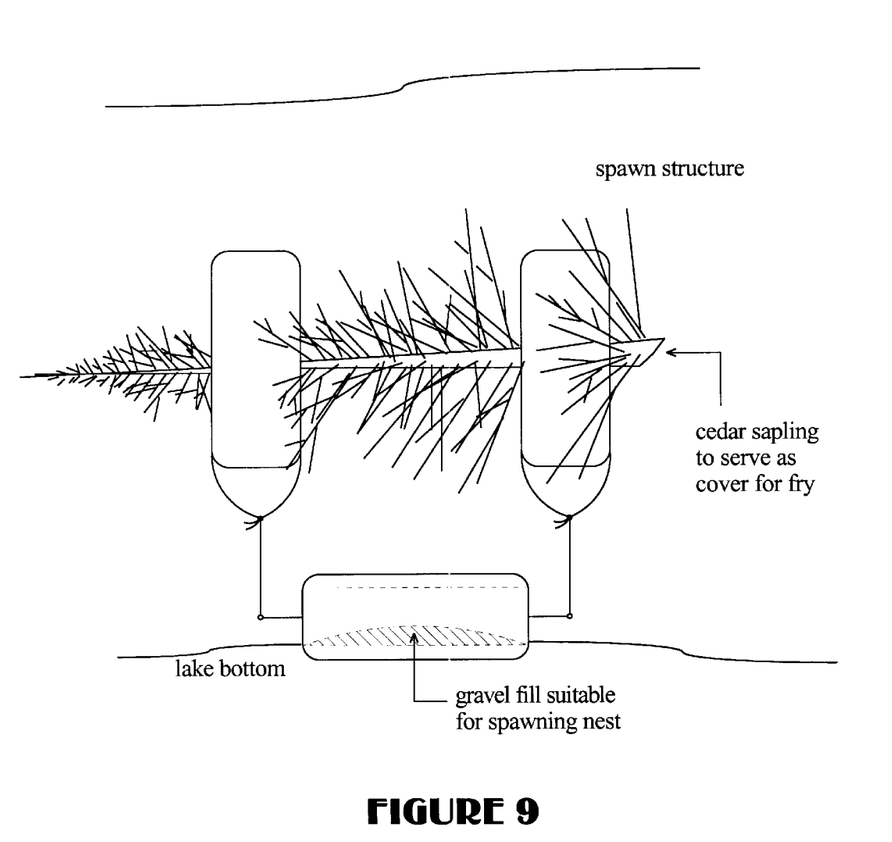
FIG. 9 is a elevation view of an embodiment of an artificial underwater habitat in a linear array with saplings inserted in the habitat for additional cover for fry and other small fish.
Figure 10:
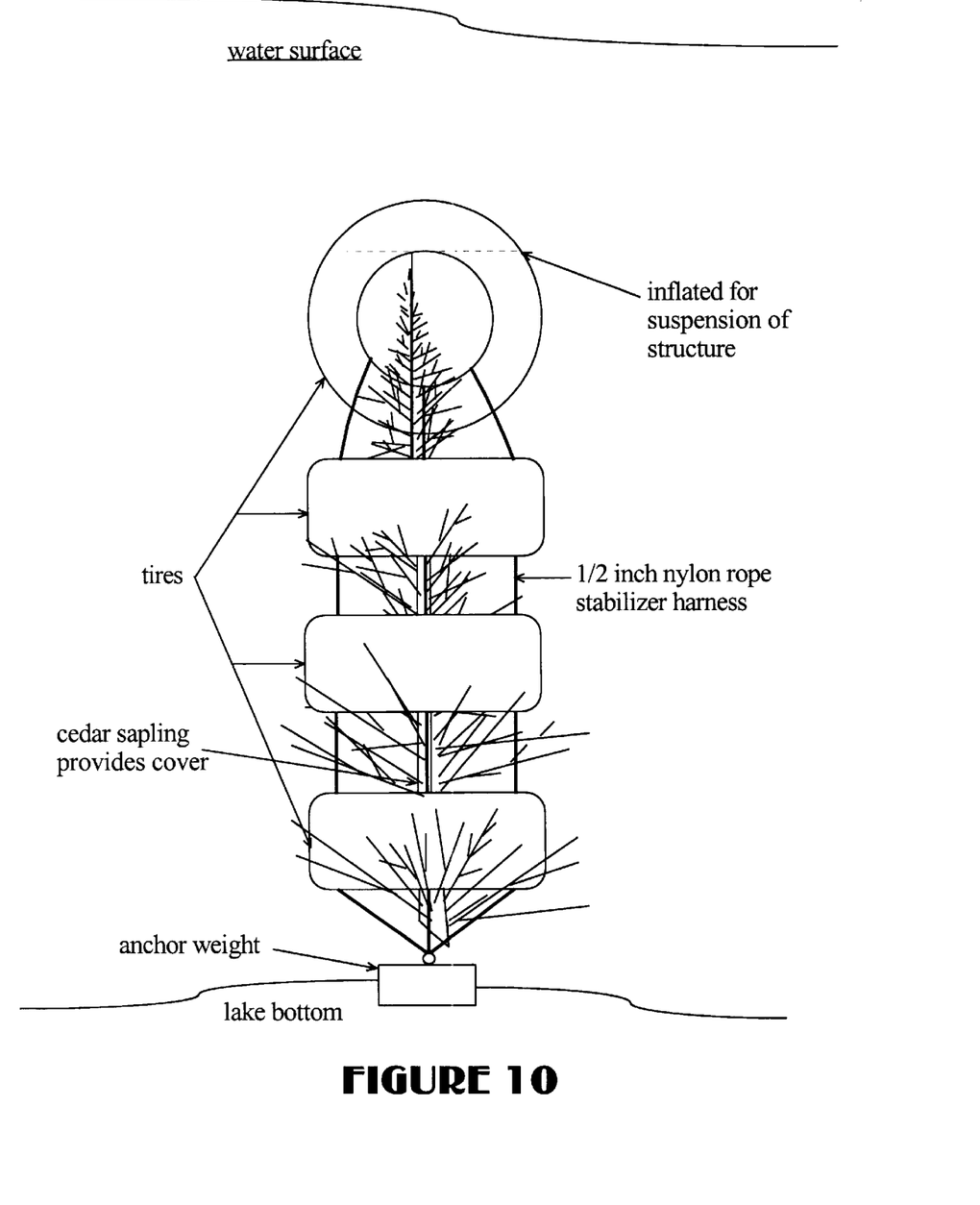
FIG. 10 is an elevation view of another embodiment of an artificial underwater habitat in a linear array with saplings inserted in the habitat for additional cover for fry and other small fish.

FIGS. 9 and 10 are elevation views of linear arrays of the structures 20 connected by conventional means to the anchors 24. The saplings 32 may also be inserted in the apertures of the structures 20 to provide additional cover for aquatic life. Selected structures include buoyancy means (not shown for clarity), such buoyancy means providing sufficient buoyant force to prevent the habitat from collapsing to the bottom of the body of water.

Figure 11:
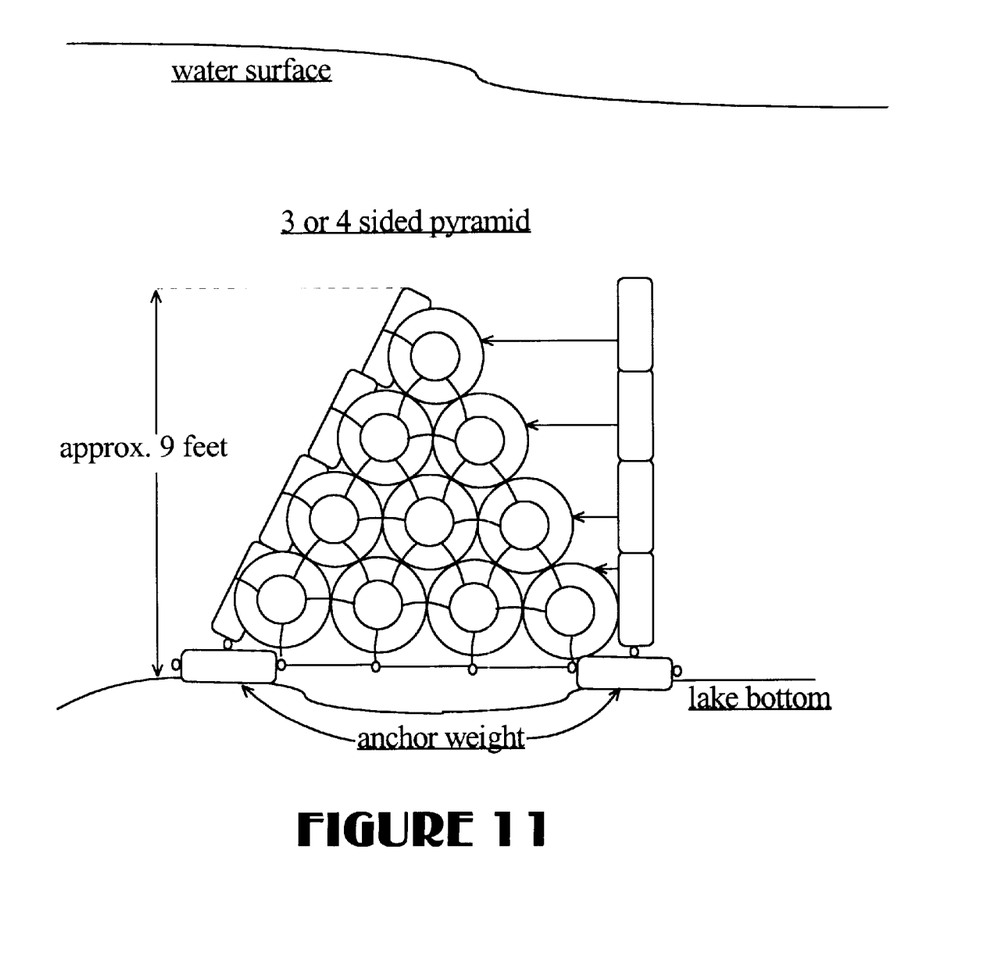
FIG. 11 is a sectional view of a horizontally-oriented tire with gas filled containers in the inwardly opening cavity of the tire to provide buoyancy.

FIG. 11 is a sectional view of a horizontally-oriented structure 20 including and inwardly opening cavity 34. The structure 20 is preferably a used tire. The sectional view of FIG. 11 is of a tire with one of the sidewalls removed in order to clearly see the inwardly opening cavity. The sectional view of FIG. 11 may be viewed as either a top plan view (looking down from a point directly above the tire) of a tire with the upper sidewall removed so as to see containers for ballast in the inwardly opening cavity; or as a bottom plan view (looking up from a point directly below the tire) of a tire with the lower sidewall removed so as to see containers for buoyancy in the inwardly opening cavity.

FIG. 11 will initially be described as a top plan view of a tire 20 with containers for ballast 40. The containers for ballast 40 may be preferably sand or concrete filled one gallon bulk food containers, although other containers will work as well. The containers may be secured in the inwardly opening cavity 34 of the tire 20 by any suitable means, such as, for example, tape, wire, rope, plastic securing devices, or fishing line. The upper sidewall of the tire 20 (not shown) will assist in preventing the containers for ballast from separating from the tire 20.

Likewise, FIG. 11 is a bottom plan view of a tire 20 with containers for buoyancy 40. The containers for buoyancy may be preferably gas filled sealed container as previously described. The containers may be secured in the downwardly opening cavity 34 of the tire 20 by any suitable means, such as, for example, tape, wire, rope, plastic securing devices, or fishing line. The lower sidewall of the tire 20 (not shown) will assist in preventing the containers for buoyancy from separating from the tire 20.

Figure 12:
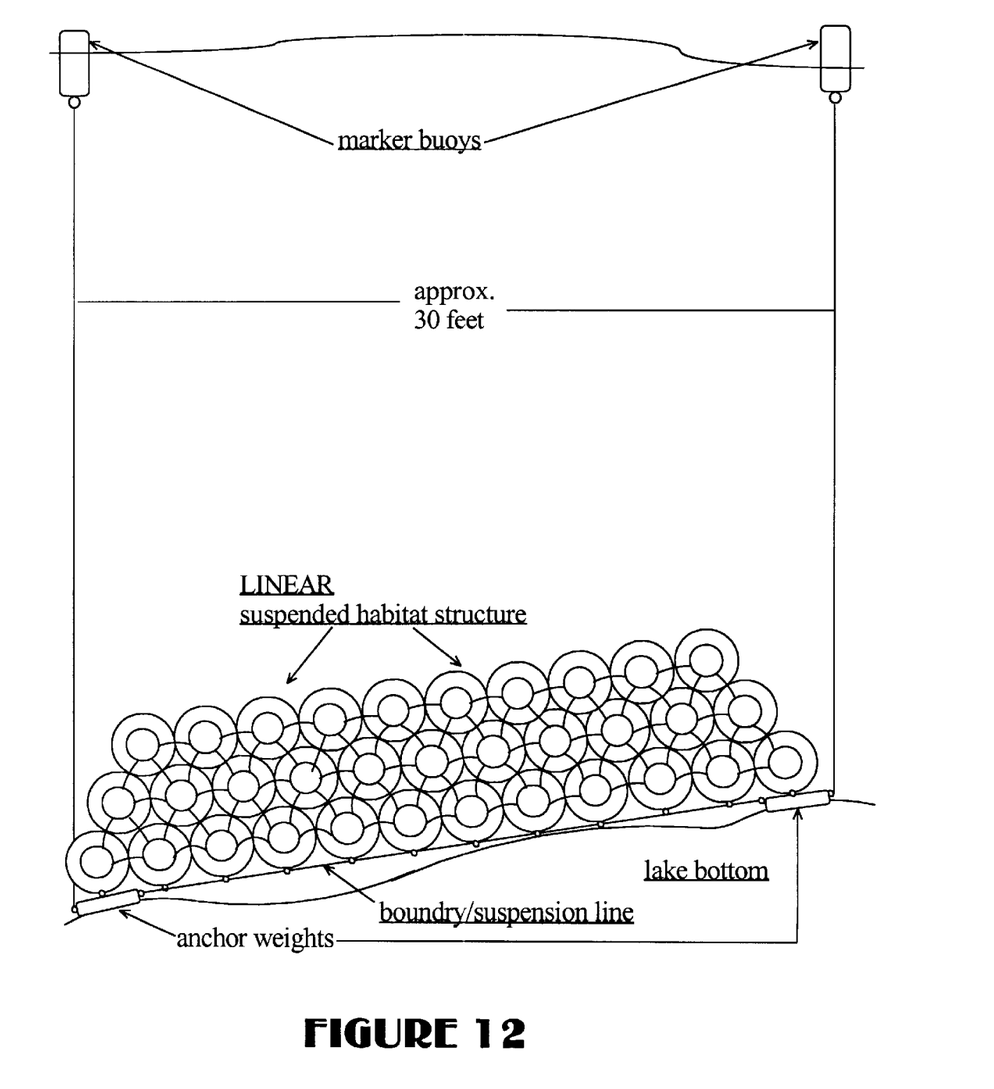
FIG. 12 is an elevation view of an artificial underwater habitat in a linear array with tires in a spaced-apart configuration supported by PVC pipe.

FIG. 12 is an elevation view of an artificial underwater habitat in a linear array with spaced apart structures 20. An anchor 24 is in contact with the bottom of a body of water 28 and includes at least one container for ballast 36. Only one container for ballast is shown for clarity but it will be understood that more than one container for ballast may be included in the anchor 24. The anchor is connected by a rigid member 42, preferably PVC pipe, to the structures 20f, 20g, and 20. The structures 20f, 20g, and 20 may include at least one container for buoyancy, such as a gas filled sealed container. Only one container for buoyancy is shown in FIG. 12 (the container for buoyancy appears in the structure 20) for clarity but it will be understood that more than one container for buoyancy may be provided in the habitat. The anchor and the structures 20f, 20g, and 20 include an inwardly opening cavity as shown in FIG. 11.

Three rigid members are shown in this preferential embodiment but it will be understood that 1, 2, 4, or more rigid members may be used. Using more than three rigid members diminishes the available space in the inwardly opening cavities of the anchor and of the structures 20f, 20g, and 20 for including ballast or buoyancy means. The rigid members are continuous from the top to the bottom of the habitat.

The anchor 24 and the structures 20f, 20g, and 20 can be held in a spaced apart manner by conventional means. The structure 20f is shown to be held in place by a dowel 44 extending through the treadwall of the tire and secured by conventional means to the PVC pipe. The structure 20g is shown to be held in place by a flexible, noncorrosive cord 46 with high tensile strength, such as 0.105 inch diameter weed trimmer cord, although it will be understood that other types of cord, rope, wire, or plastic fasteners may be substituted for the weed trimmer cord. The weed trimmer cord 46 is laced through holes drilled in the PVC pipe above and below the structure 20g and secured to the PVC pipe by conventional means, such as crimping. It is to be understood that the anchor 24 and the structure 20 are connected to the PVC pipe in a manner similar to that described above for the structures 20f and 20g. The connections for the anchor and the structure 20 have been omitted from the drawing for the sake of clarity.

The periphery of the habitat of FIG. 12 may be covered with a fine plastic screen (not shown for clarity) attached to the treadwall of the anchor 24 and the structures 20f, 20g, and 20. The screen may be attached by screws, nuts and bolts, nails, or staples. The screen provides additional protection for small aquatic life in the habitat.

Figure 13:
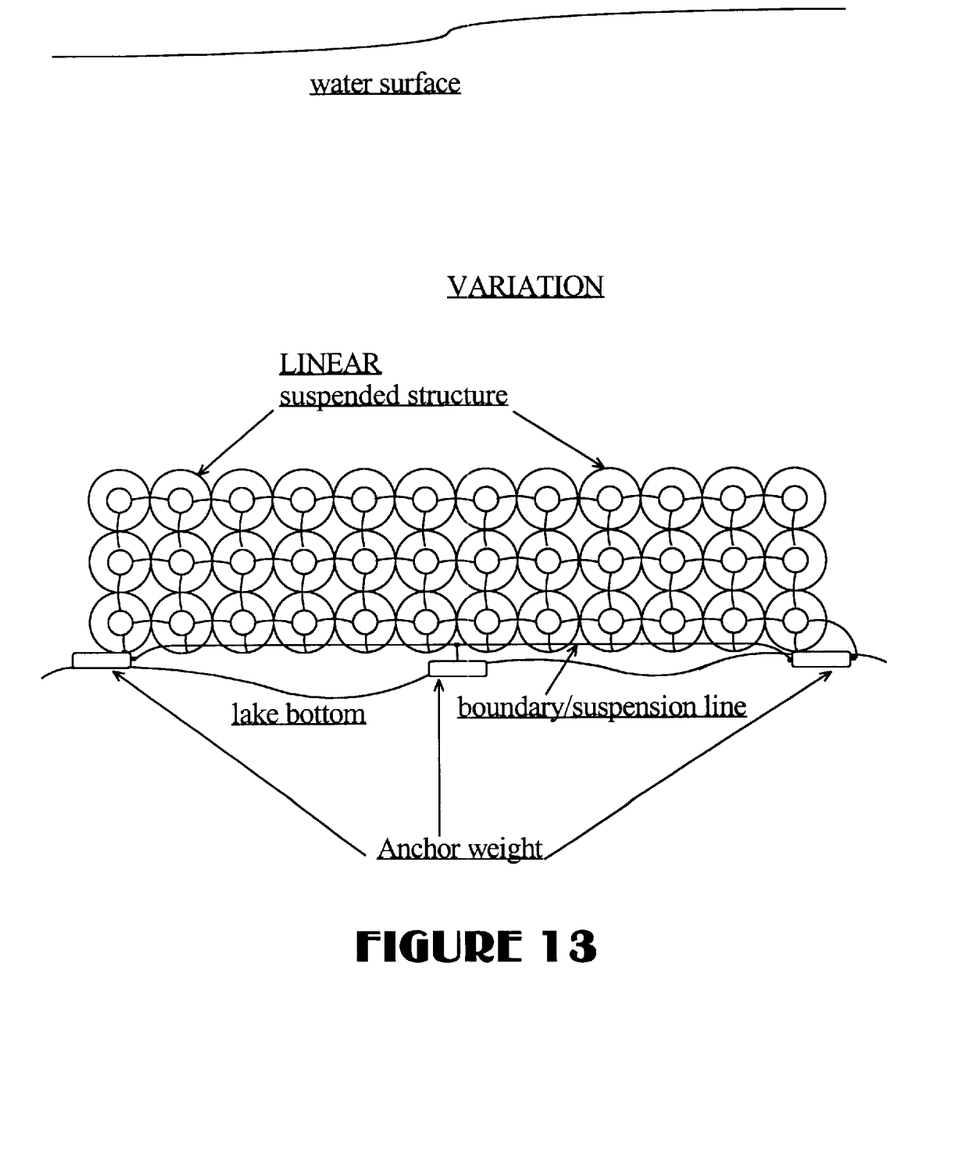
FIG. 13 is a perspective view of the artificial underwater habitat of FIG. 12.

The artificial underwater habitat shown in FIG. 13 is a perspective view of the habitat shown in FIG. 12 and is included to show additional detail to the features described in FIG. 12. The structure 20f and dowels 44 in FIG. 12 are omitted from FIG. 13 for clarity. The numbered features in FIG. 13 correspond to the numbered features in FIG. 12.

Figure 14:
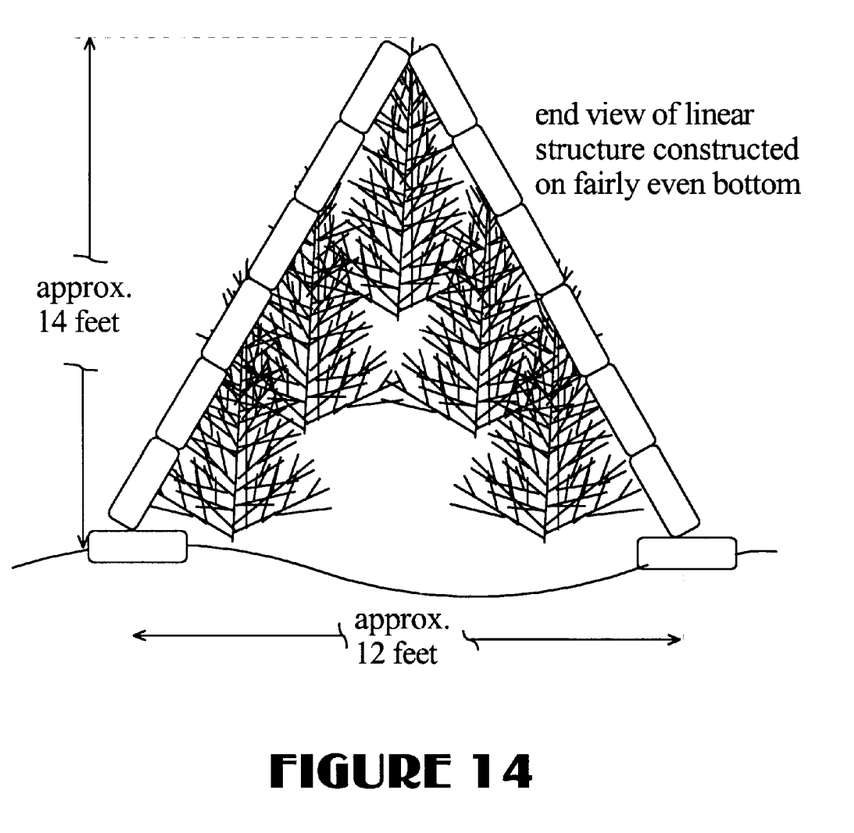
FIG. 14 is an exploded view of the bottle cap and gasket assembly for constructing gas filled containers for buoyancy.

FIG. 14 is an exploded view of the bottle cap and gasket assembly for constructing gas filled containers for buoyancy. An aperture 56 is drilled in the center of the twist-on bottle cap 52. A gasket 54 is preferably cut from a discarded medium-weight inner tube, although it will be understood by one of ordinary skill in the art that any similar type of material that can function in a similar manner can be used. An eccentric aperture 58 is formed in the gasket by drilling or using a conventional paper punch. The aperture 58 is preferably one-eighth of an inch from the outer edge of the gasket. It is imperative that the aperture 56 in the bottle cap 52 does not align with the aperture 58 in the gasket 54.

The gasket is preferably dipped in a soap and water solution to increase the pliability of the gasket. The gasket is then inserted into the cap and the cap is screwed onto the bottle 50.

The bottle is charged with pressurized gas by the introduction of a nozzle into the aperture 56 in the cap. The pressurized gas causes the gasket to flex away from the inside surface of the cap thereby creating a passage between the inside surface of the cap and the gasket between aperture 56 and aperture 54 allowing the pressurized gas to enter the bottle. When the nozzle is withdrawn from the aperture 56, the gasket flexes back to make contact with the inside surface of the cap closing the aforementioned passage. Since the aperture in the cap and the aperture in the gasket are not aligned, the pressure of the gas in the container forces the gasket against the inside surface of the cap thereby sealing the bottle.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. An artificial underwater habitat comprising:
   a structure having a downwardly opening cavity and an upwardly opening cavity,
   a buoyant material in said downwardly opening cavity; and
   an anchor operatively connected to said structure;
   said structure being maintained in a predetermined orientation by the material in said cavity and the anchor.

2. The artificial underwater habitat of claim 1 wherein said anchor comprises a non-buoyant material in said upwardly opening cavity.

3. The anchor of claim 2 wherein said non-buoyant material is concrete, concrete block, or wire mesh and gravel.

4. The artificial underwater habitat of claim 2 wherein said structure includes at least one tire.

5. The artificial underwater habitat of claim 2 wherein said structure includes a plurality of tires wherein each one of said plurality of tires is operatively connected to at least one other of said plurality of tires to thereby form a system of tires.

6. The artificial underwater habitat of claim 5 wherein said plurality of tires are operatively connected to form at least one linear array of tires.

7. The artificial underwater habitat of claim 6 wherein the tread of a selected one of the plurality of tires is in contact with the tread of each tire of the plurality of tires to which said selected tire is operatively connected.

8. The artificial underwater habitat of claim 6 wherein said plurality of tires forming said system are uniformly oriented.

9. The artificial underwater habitat of claim 6 wherein said plurality of tires forming said system are oriented so that alternating tires are rotated ninety degrees.

10. The artificial underwater habitat of claim 5 wherein said plurality of tires are operatively connected to form at least one planar array of tires.

11. The artificial underwater habitat of claim 10 wherein the tread of a selected one of the plurality of tires is in contact with the tread of each tire of the plurality of tires to which said selected tire is operatively connected.

12. The artificial underwater habitat of claim 10 wherein said plurality of tires forming said system are uniformly oriented.

13. The artificial underwater habitat of claim 1 wherein said buoyant material is a gas filled sealed container.

14. The buoyant material of claim 13 wherein said sealed container is filled with a compressed gas.

15. The sealed container of claim 13 wherein said container is sealed by a cap having a central aperture therein and a gasket having an eccentric aperture therein, said gasket being sufficiently flexible to be separable from the cap by the insertion of gas to thereby provide fluid communication between the interior and exterior of the container and said gasket being sufficiently resilient to return to a position immediately adjacent the cap under pressure from the interior of the container when gas is no longer being inserted.

16. The artificial underwater habitat of claim 1 wherein said anchor is operatively connected to the structure by a flexible member.

17. The artificial underwater habitat of claim 1 where said anchor is operatively connected to the structure by a rigid member.

18. An artificial underwater habitat comprising:
   a plurality of tires each one of said tires having an inwardly opening cavity;
   means for connecting said tires in a spaced-apart manner to form a linear array of tires;
   a non-buoyant material in said cavity of a first set of selected tires; and
   a buoyant material in said cavity of a second set of selected tires, wherein said first set and said second set of tires are not mutually exclusive;
   said linear array of tires being maintained in a predetermined orientation by the non-buoyant and buoyant materials.

19. The artificial underwater habitat of claim 18 wherein said means for connecting said structures includes PVC pipe.

* * * * *